United States Patent [19]

Koizumi

[11] 3,998,497

[45] Dec. 21, 1976

[54] GUIDE ROD APPARATUS

[75] Inventor: Yutaka Koizumi, Tokyo, Japan

[73] Assignee: Ricoh Company, Ltd., Tokyo, Japan

[22] Filed: July 8, 1975

[21] Appl. No.: 594,180

[30] Foreign Application Priority Data

July 11, 1974 Japan .............................. 49-79541

[52] U.S. Cl. ............................................. 308/3 R
[51] Int. Cl.² ......................................... F16C 19/00
[58] Field of Search ........... 308/3 R, 3 A, 6 R, 208, 308/18, 20; 197/18, 55, 1 R, 60, 61; 301/5.3, 5.7, 36 R, 36 WP; 104/106, 107, 245, 246; 29/110, 123, 124, 125

[56] References Cited

UNITED STATES PATENTS

| 2,823,402 | 2/1958 | Phillips | 29/121 A X |
| 3,875,868 | 4/1975 | Martin | 104/173 X |

Primary Examiner—M. H. Wood, Jr.
Assistant Examiner—Gene A. Church
Attorney, Agent, or Firm—Frank J. Jordan

[57] ABSTRACT

First and second horizontally disposed parallel guide rods are provided to guide an object. First and second roller assemblies are fixed to the object and rollingly connect the object to the first guide rod and a third roller assembly fixed to the other side of the object rollingly connects the object to the second guide rod. The third roller assembly comprises a shaft fixed to the object and a roller carried by the shaft which rollingly rides on the top of the second guide rod. The first and second roller assemblies each comprise a shaft fixed to the object carrying first and second rollers spaced from each other along the shaft. The first and second rollers straddle the top of the first guide rod and rollingly ride on the upper surface thereof. The apparatus further comprises a shaft fixed to the object which carries a roller, the top of which rollingly engages with the lower surface of the first guide rod.

9 Claims, 4 Drawing Figures

GUIDE ROD APPARATUS

The present invention relates to apparatus for precisely guiding a movable object such as a platen of an electrostatic copying machine.

Apparatus is known in the art for precisely guiding an object such as a platen along a horizontal path. Such apparatus comprises a pair of horizontally disposed, parallel guide rods. First and second roller assemblies fixed to the platen ride on one of the guide rods and a third roller assembly fixed to the opposite side of the platen rides on the other guide rod. The first and second roller assemblies as known in the prior art suffer from disadvantages including excessive friction and wear, complexity of design and difficulty of precise manufacture.

It is therefore an object of the present invention to provide apparatus for precisely guiding an object such as a platen of an electrostatic copying machine which overcomes the above mentioned drawbacks of the prior art.

The above and other objects, features and advantages of the present invention will become clear from the following detailed description taken with the accompanying drawings, in which.

Figure 1A:
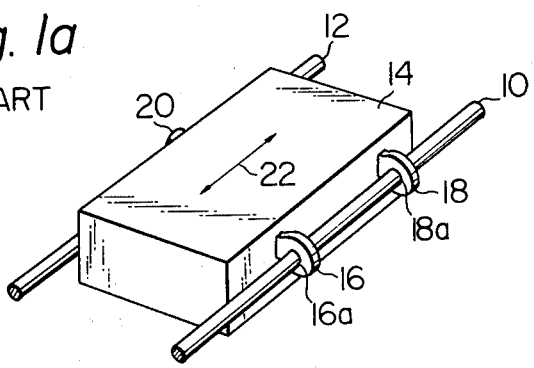
FIGS. 1a, 1b and 1c are perspective views of prior art guide rod apparatus.

Referring now FIG. 1a, a prior art guide rail or rod assembly comprises first and second horizontally disposed parallel guide rods 10 and 12 for guiding an object 14 such as a platen of an electrostatic copying machine. First and second studs 16 and 18 are fixed to the object 14 and are formed with holes 16a and 18a through which the first guide rod 10 slidingly extends. A third stud 20 is fixed to the opposite side of the object 4 and is formed with a hole (not visible) through which the second guide rod 12 slidingly extends. The object 14 may be moved by drive means (not shown) so as to be guided by the apparatus for movement in the direction of an arrow 22.

In order for the apparatus shown in FIG. 1 to precisely guide the object 14, the guide rods 10 and 12 and the holes in the studs 16, 18 and 20 must have precisely the same diameter with little or no clearance. This necessitates precise and expensive machining operations. In addition, an excessive amount of friction is inherent in the apparatus due to the small clearances, especially when starting the object 14 into motion from a standstill. This friction results in excessive wear of the guide rods 10 and 12 and the studs 16, 18 and 20, and becomes especially problematic when the guide rods 10 and 12 become dirty or otherwise contaminated.

Figure 1B:
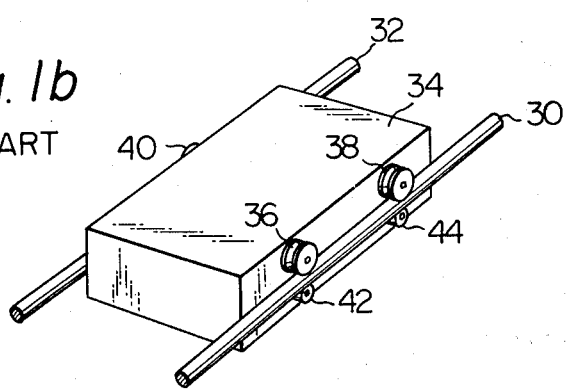

Referring now to FIG. 1b, another prior art apparatus comprises first and second guide rods or rails 30 and 32 to guide an object 34. The object 34 is rollingly supported by the guide rods 30 and 32 by means of first and second roller assemblies 36 and 38 which ride on the first guide rod 30 and a third roller assembly 40 which rides on the second guide rod 32. The third roller assembly 40 is not clearly visible but simply consists of a shaft fixed to the object 34 which rotatably carries a roller which rides on the second guide rod 32. Roller assemblies 42 and 44 which are similar to the roller assembly 40 rollingly engage with the bottom surface of the first guide rod 30.

Figure 2:
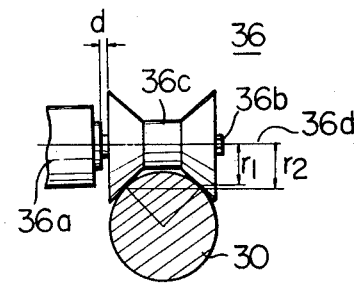
FIG. 2 is an enlarged view of part of the apparatus shown in FIG. 1b.

Referring now to FIG. 2, the roller assembly 36 is shown in enlarged form as comprising a large diameter shaft 36a which is fixed to the object 34. A smaller diameter shaft 36b integrally extends from the shaft 36a. A bobbin shaped roller 36c is rotatably carried by the shaft 36b and rides on the upper surface of the first guide rod 30. The roller 36c is formed of two tapered portions which face each other and a cylindrical portion connecting the two tapered portions (no numerals). The tapered portions engage with the guide rod 30. The major drawback of this apparatus is that it is very difficult to machine the roller 36c so that the tapers of the two tapered portions are equal. In most cases, due to inaccuracies in machining, the distances of the points of contact of the tapered portions of the roller 36c and the guide rod 30 to an axis 36d of the shaft 36b differ slightly as designated by distances $r_1$ and $r_2$. This effect is more pronounced if a clearance $d$ is provided between the end of the shaft 36a and the roller 36c. The result is that as the roller 36c moves on the guide rod 30 one or the other of the tapered portions of the roller 36c will slip. This is because the distances $r_1$ and $r_2$ which constitute the effective rolling radii of the tapered portions of the roller 36c are different and the tapered portions of the roller 36c would have to move at different speeds to maintain rolling contact with the guide rod 30. This slippage is the cause of friction and wear.

Figure 1C:
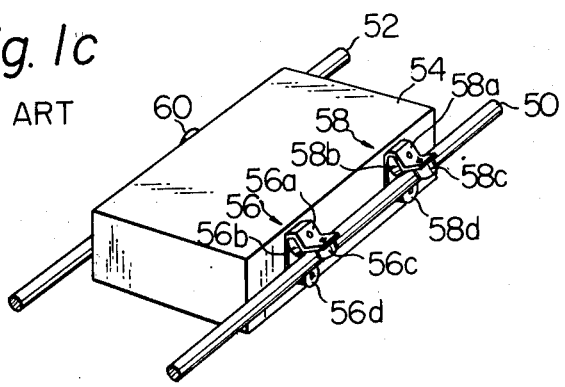

Yet another prior art apparatus is shown in FIG. 1c, which comprises first and second guide rods 50 and 52 to guide an object 54. A third roller assembly 60 similar to the roller assembly 40 rides on the second guide rod 52. First and second roller assemblies 56 and 58 comprise brackets 56a and 58a fixed to the object 54 and rollers 56b and 58b, 56c and 58c and 56d and 58d which are rotatably carried by the brackets 56a and 58a and rollingly engage with the guide rod 50 from three respectively different directions. The drawback of this apparatus is that the brackets and rollers must be constructed precisely in order to maintan rolling contact between all of the rollers and the guide rod 50. Such a construction is difficult and expensive.

Figure 3:
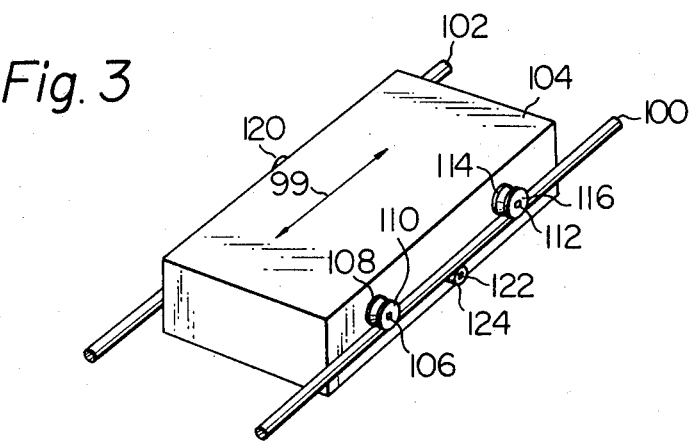
FIG. 3 is a perspective view of a guide rod apparatus according to the present invention.
Figure 4:
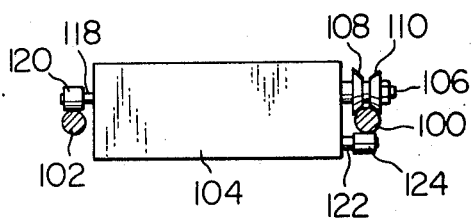
FIG. 4 is an end view of the apparatus shown in FIG. 3.

Referring now to FIGS. 3 and 4, apparatus embodying the present invention is shown which overcomes the drawbacks of the prior art apparatus discussed above.

The apparatus comprises two horizontally disposed parallel guide rods 100 and 102 to guide an object 104. A first shaft 106 is fixed to the object 104 and rotatably carries first and second rollers 108 and 110 which ride on the guide rod 100. A second shaft 112 fixed to the object 104 rotatably carries third and fourth rollers 114 and 116 which ride on the guide rod 100. A third shaft 118 is fixed to the opposite side of the object 104 from the first and second shafts 106 and 112 and rotatably carries a fifth roller 120 which rides on the guide rod 102. A fourth shaft 122 is fixed to the object 104 and rotatably carries a sixth roller 124 which rollingly engages with the bottom surface of the guide rod 100. The object 104 is movable in the direction of an arrow 99 in FIG. 3. It is to be noted that the pressure exerted on the guide rod 100 by the sixth roller 124 and rollers 108, 110, 114 and 116 may be adjustably varied by moving the fourth shaft 122 upward and downward.

The shaft 118 is parallel to a plane passing through the guide rods 100 and 102 and perpendicular to the axes thereof. The shafts 106 and 112 are parallel to the shaft 118 and extend in the opposite direction therefrom. The shaft 122 is parallel to the shafts 106 and 112 and extends in the same direction thereof.

Figure 5:
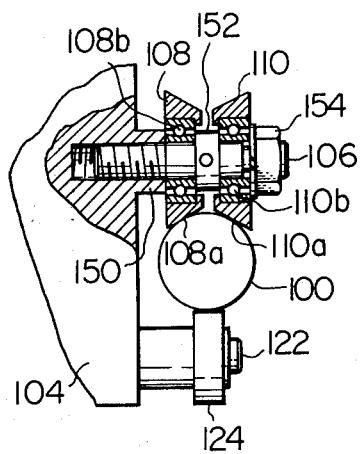
FIG. 5 is an enlarged view of part of the apparatus shown in FIG. 3.

Referring now to FIG. 5, the shafts 106 and 122 and rollers 108, 110 and 124 are shown in enlarged scale. The shaft 106 is in the form of a bolt, and the rollers 108 and 110 are carried on the shaft 106 between a hub 150 and a setting nut 154 with a spacer 152 therebetween. The rollers 108 and 110 have tapered radially outer surfaces 108a and 110a which face each other and ride on the guide rod 100. The rollers 108 and 110 are integrally formed with rolling contact ball bearings 108b and 110b to reduce friction to a minimum.

It will be understood that even if the effective rolling radii of the rollers 108 and 110 are different, there will be no significant friction since the rollers 108 and 110 rotate and roll independently. The apparatus is easy and inexpensive to manufacture since highly accurate machining is not required but will still guidingly support the object 104 with precision.

Figure 6:
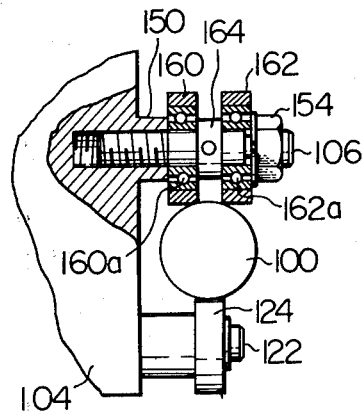
FIG. 6 is similar to FIG. 5 but shows a modification.

Referring now to FIG. 6, it is not necessary for the rollers 108 and 110 to be provided with the tapered surfaces 108a and 110a. Rollers 160 and 162 separated by a spacer 164 may be provided which have cylindrical radially outer surfaces as shown. Rolling contact bearings 160a and 162a may be incorporated into the rollers 160 and 162 respectively. In this case, the lower right and left corners of the rollers 160 and 162 respectively rollingly engage with guide rod 100.

Other modifications will become possible for those skilled in the art after receiving the teachings of the present disclosure.

What is claimed is:

1. Apparatus for guiding a movable object, comprising:
    first and second parallel guide rods;
    first and second parallel shafts fixed to the object, the first shaft rotatably carrying first and second rollers straddling an upper surface of the first guide rod and rollingly riding thereon, the second shaft rotatably carrying third and fourth rollers straddling the upper surface of the first guide rod and rollingly riding thereon;
    a third shaft fixed to the object and rotatably carrying a fifth roller, the fifth roller rollingly riding on an upper surface of the second guide rod; and
    a fourth shaft fixed to the object and carrying a sixth roller which rollingly engages with a bottom surface of the first rod, the fourth shaft being disposed parallel to a plane passing through the first and second guide rods and perpendicular to the axes of the first and second guide rods.

2. The apparatus according to claim 1, in which the first, second and third shafts are disposed parallel to each other and to a plane passing through the first and second guide rods and perpendicular to the axes of the first and second guide rods.

3. The apparatus of clam 1, in which the first and second rollers have tapered radially outer surface which face each other and the third and fourth rollers have tapered radially outer surfaces which face each other.

4. The apparatus of claim 1, in which each of the first, second, third and fourth rollers comprises a bearing.

5. The apparatus of claim 4, in which each bearing is a rolling contact bearing.

6. The apparatus of claim 1, further comprising a first spacer disposed between the first and second rollers and a second spacer disposed between the third and fourth rollers.

7. The apparatus of claim 1, in which the third shaft is disposed on an opposite side of the object from the first and second shafts.

8. The apparatus of claim 1, in which the first, second and third shafts extend away from the object, the third shaft extending in an opposite direction from the first and second shafts.

9. The apparatus of claim 1 wherein said first and second parallel shafts are disposed parallel to a plane passing through the first and second guide rods and perpendicular to the axes of the first and second guide rods.

* * * * *